United States Patent
Cagney et al.

(10) Patent No.: US 9,028,783 B2
(45) Date of Patent: May 12, 2015

(54) COLD START STARTUP UNIT FOR UREA-BASED SYSTEMS

(75) Inventors: John L. Cagney, Downers Grove, IL (US); Houman Kashanipour, Batavia, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 0 days.

(21) Appl. No.: 14/343,081

(22) PCT Filed: Jun. 8, 2012

(86) PCT No.: PCT/US2012/041588
§ 371 (c)(1),
(2), (4) Date: Mar. 6, 2014

(87) PCT Pub. No.: WO2013/036308
PCT Pub. Date: Mar. 14, 2013

(65) Prior Publication Data
US 2014/0241963 A1 Aug. 28, 2014

Related U.S. Application Data

(60) Provisional application No. 61/531,368, filed on Sep. 6, 2011.

(51) Int. Cl.
*B01D 53/94* (2006.01)
*F01N 3/20* (2006.01)
*F01N 3/10* (2006.01)

(52) U.S. Cl.
CPC ............ *B01D 53/9431* (2013.01); *F01N 3/208* (2013.01); *F01N 2410/06* (2013.01); *F01N 2610/02* (2013.01); *F01N 2610/10* (2013.01); *F01N 2610/1406* (2013.01); *Y02T 10/24* (2013.01); *F01N 3/10* (2013.01)

(58) Field of Classification Search
CPC B01D 53/9409; B01D 53/9431; F01N 3/206; F01N 3/208
USPC .............. 423/212, 213.2, 239.1; 60/274, 295, 60/299, 301
See application file for complete search history.

(56) References Cited

U.S. PATENT DOCUMENTS

| | | | |
|---|---|---|---|
| 8,015,801 B2* | 9/2011 | Oberski et al. | 60/286 |
| 8,101,145 B1* | 1/2012 | Norton et al. | 423/213.2 |
| 8,293,197 B2* | 10/2012 | Winkler et al. | 423/213.2 |
| 8,381,514 B2* | 2/2013 | Salanta et al. | 60/286 |
| 2007/0122317 A1* | 5/2007 | Driscoll et al. | 422/170 |
| 2011/0197569 A1* | 8/2011 | Salanta et al. | 60/286 |
| 2013/0232958 A1* | 9/2013 | Ancimer et al. | 60/301 |

* cited by examiner

*Primary Examiner* — Timothy Vanoy
(74) *Attorney, Agent, or Firm* — Jeffrey P. Calfa; Mark C. Bach

(57) ABSTRACT

An exhaust after-treatment system is described. Generally speaking, the system includes separate primary and secondary NOx reducing systems for delivering reductant to an exhaust stream, a sensor system for determining relevant operating conditions and an electronic control module for activating the reducing systems. Methods for reducing NOx in an exhaust stream are also described. Generally speaking, the methods include the steps of determining a need for NOx reduction in an exhaust stream, determining exhaust temperature, determining ambient temperature, and injecting at least one of a primary reductant and a secondary reductant into the exhaust stream based on the determined temperature. The system and method are particularly useful during cold start conditions, as well as lightly loaded application in conditions where the ambient temperature is below 45 F where the SCR catalyst may not fully function.

9 Claims, 3 Drawing Sheets

COLD START STARTUP UNIT FOR UREA-BASED SYSTEMS

CROSS-REFERENCE TO RELATED APPLICATIONS

This application claims the benefit of U.S. Patent Application Ser. No. 61/531,368 filed on Sep. 6, 2011.

TECHNICAL FIELD

The present disclosure relates to a system and method for treating an exhaust stream in a vehicle exhaust system. Particularly, the present disclosure provides a method for improving the reduction of nitrogen oxides ($NO_x$) in the exhaust gas stream through delivery of a suitable amount of reductant into a vehicle exhaust stream.

BACKGROUND

Diesel engines are efficient, durable and economical. In the past 20 years, governments such as the United States and the European Union, have proposed stricter diesel exhaust emission regulations. These environmental regulations require diesel engines to meet increasingly stricter pollution emission standards. Typically, to meet such regulations and standards, diesel engine systems require equipment additions and modifications.

For example, a lean burning engine provides improved fuel efficiency by operating with an amount of oxygen in excess of the amount necessary for complete combustion of the fuel. Such engines are said to run "lean" or on a "lean mixture." However, the increase in fuel efficiency is offset by the creation of undesirable pollution emissions in the form of nitrogen oxides ($NO_x$). Nitrogen oxide emissions are regulated through regular emission testing requirements. One method used to reduce $NO_x$ emissions from lean burn internal combustion engines is known as selective catalytic reduction (SCR). When used to reduce $NO_x$ emissions from a diesel engine, selective catalytic reduction involves injecting atomized urea or ammonia gas into the exhaust stream of the engine prior to the catalyst.

The main components of a common SCR system are a tank for storing urea and an injection system for delivering the urea into the exhaust, as well as an SCR catalytic chamber for the $NO_x$ reduction to occur. Typically, an onboard diagnostic system monitors the urea level and indicates when the storage tank needs to be refilled. However, while the urea is a high-purity, colorless solution containing 32.5% urea, its high water content (over 65% deionized water) makes this solution very susceptible to freezing in the tank at cold ambient temperatures, as well as very difficult to vaporize in cool exhaust streams.

The fluid cannot be pumped and subsequently sprayed if it is frozen in the tank. Further, when exhaust temperatures are low, poor atomization of the urea can occur and potentially lead to formation of undesirable deposits or the low exhaust temperatures result in a catalyst temperature that is not adequate to achieve the reduction in $NO_x$ required to meet the regulations. Accordingly, in order to be in compliance with emission standards, alternate dosing is needed during such times. The present system and methods solve these and other problems associated with prior art $NO_x$ reduction systems.

SUMMARY

An exhaust after-treatment system is described and claimed. Generally speaking, the system comprises separate primary and secondary $NO_x$ reducing systems for delivering reductant, generally ammonia and urea, respectively, to an exhaust stream, a sensor system for determining relevant operating conditions and an electronic control module for activating the reducing systems. The two $NO_x$ reducing systems include flow control modules coupled to the electronic control module.

In an embodiment, an exhaust after-treatment system, is described. The system includes a primary system having a tank or canister with a pre-determined amount of a first reductant-containing material stored therein, the primary system having a primary flow control module, a secondary system having a tank or canister a pre-determined amount of a second reductant material stored therein, the secondary system having a secondary flow control module, a dosing control system for determining the amount of reductant released from the primary system and the secondary system relative to operating conditions, and, an electronic control module for initially activating the primary flow control module and then the secondary flow control module based on operating conditions.

Methods for reducing $NO_x$ in an exhaust stream are also described and claimed. Generally speaking, the methods comprise the steps of determining a need for $NO_x$ reduction in an exhaust stream, determining operation conditions and/or ambient temperature, and injecting at least one of a primary reductant and a secondary reductant into the exhaust stream based on the determined conditions and/or temperature. Typically, the primary reductant comprises ammonia and the secondary reductant comprises urea.

In an embodiment, the method includes the steps of providing a primary $NO_x$ reducing unit having a pre-determined amount of a first reductant-containing material stored therein, the primary unit having a primary dosing control system, providing a secondary $NO_x$ reducing unit having a pre-determined amount of a second reductant material stored therein, the secondary unit having a secondary dosing control system, providing a plurality of sensors connected to the primary dosing control system and the secondary dosing control system, activating release of a first reductant from the primary unit into an exhaust stream based on a determination of a threshold ambient temperature through the sensors, injecting the first reductant into an exhaust stream upon activation, activating release of the second reductant from the secondary unit into the exhaust stream based upon a determination of operating conditions through the sensors and, injecting the secondary reductant into the exhaust stream.

In yet another embodiment, the method further includes the step of stopping a flow of the first reductant into the exhaust stream upon activating release of the second reductant into the exhaust stream.

DETAILED DESCRIPTION

Figure 1:
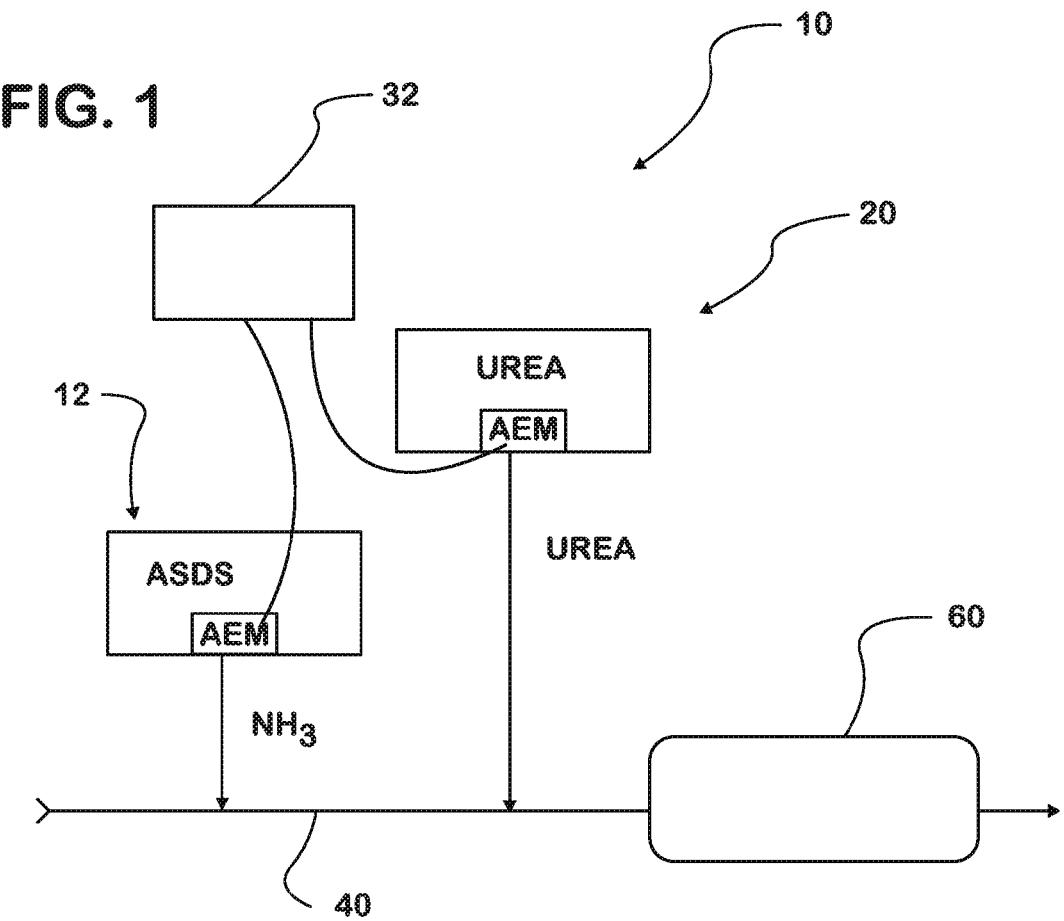
FIG. 1 is a schematic illustrating one embodiment of the present system.
Figure 2:
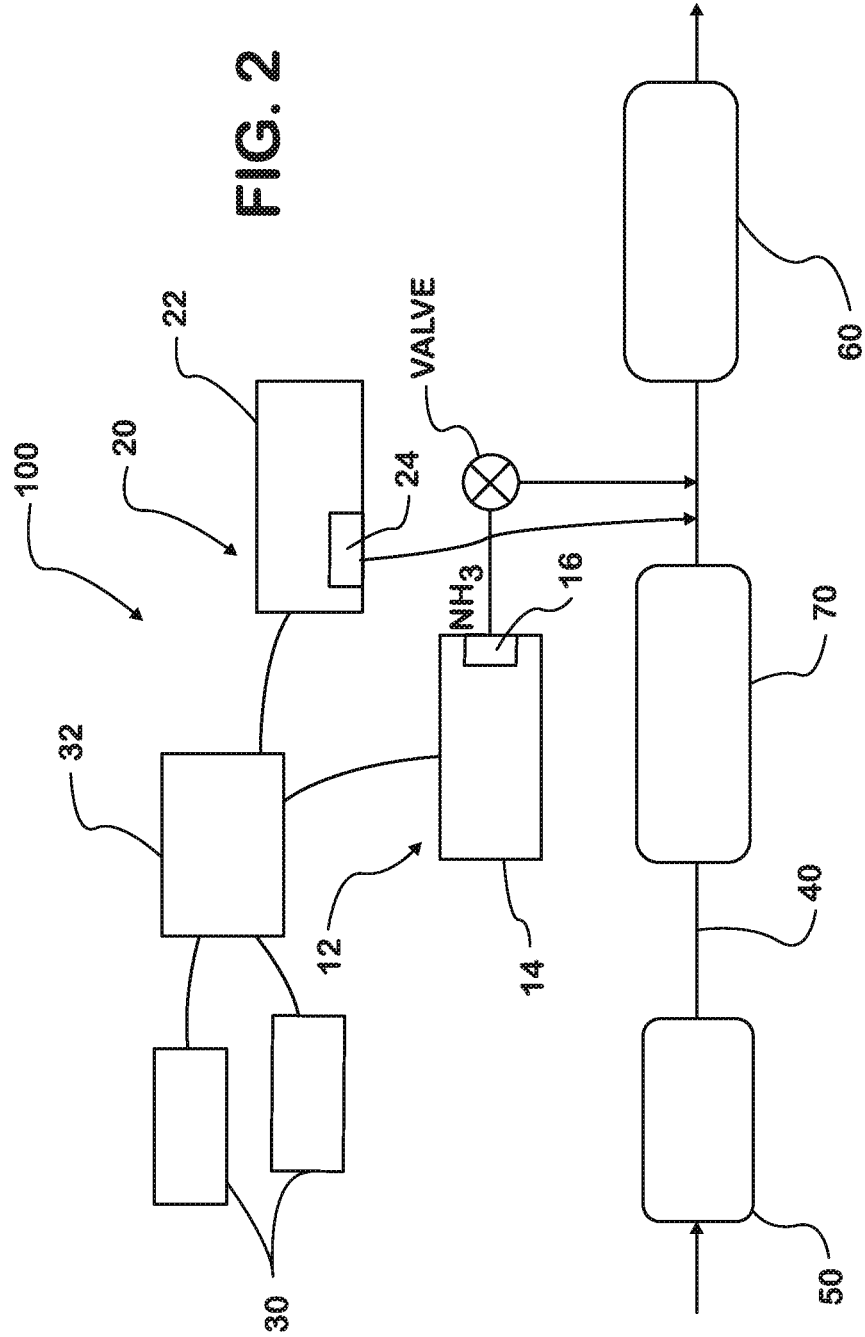
FIG. 2 is a schematic illustrating another embodiment of the present system; and, FIG. 3 is a schematic illustrating yet another embodiment of the present system.
Figure 3:
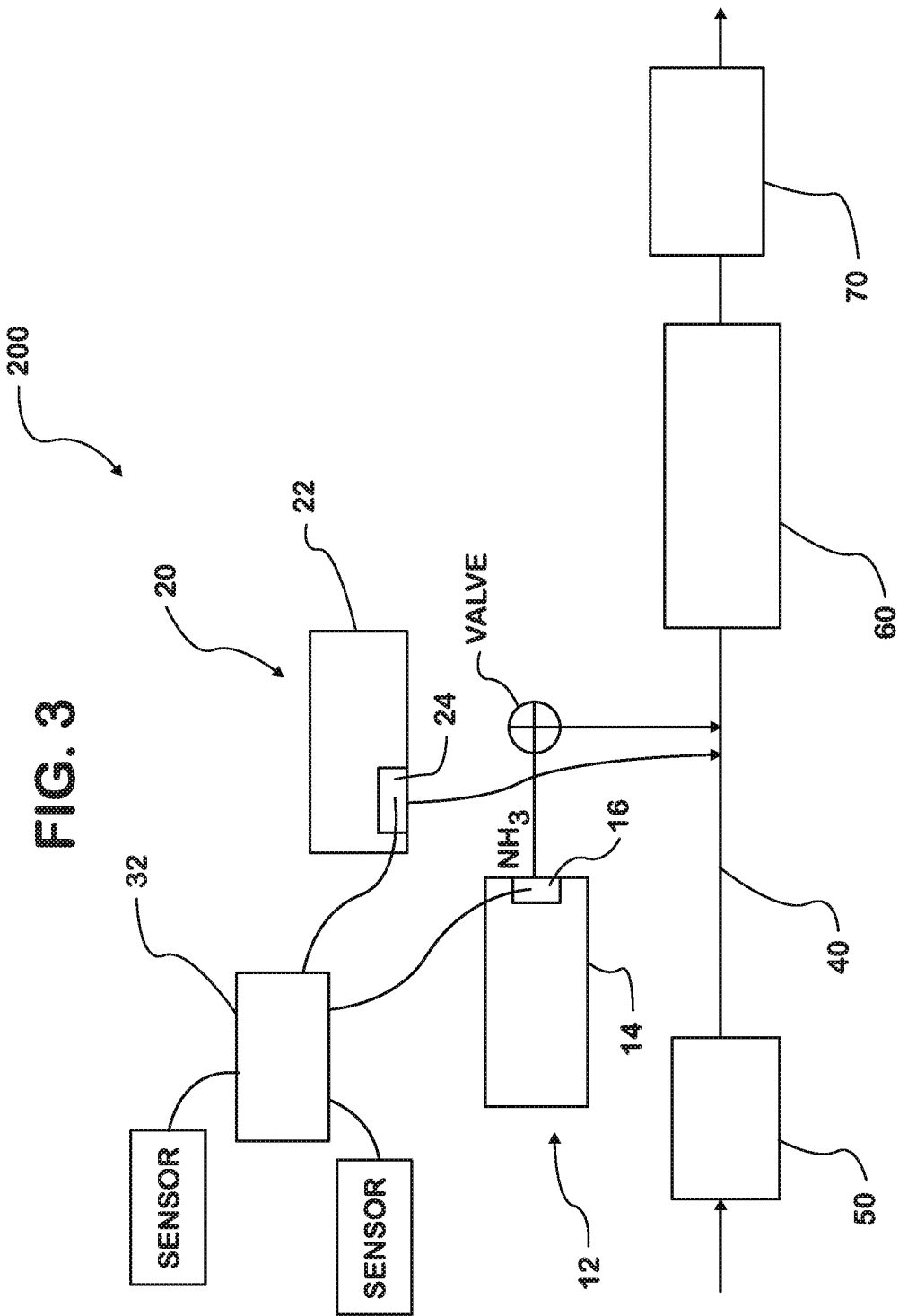

Referring to FIGS. 1-3, an exhaust after-treatment system 10 and variations thereof, are illustrated. The present exhaust after-treatment system, which may be retrofitted onto existing urea-based systems, or provided in conjunction with a urea-based system as part of a new overall after-treatment system, is useful for cold ambient start-up of a system incorporating a urea system. The present system 10 comprises a primary $NO_x$ reducing system 12 which is used for the initial delivery of a reductant, such as ammonia to an exhaust stream 40. The primary system 12 includes a refillable or replaceable tank or canister 14 for storing a reductant-containing material (not shown) and a primary flow control module 16, which regulates the flow of reductant from the canister 14 into the exhaust stream 40. For example, the primary system may be an ammonia storage and delivery system (ASDS). Other components that may be incorporated into the system include: a DOC (diesel oxidation catalyst) 50, a SCR (selective catalytic reduction catalyst) 60 and a DPF (diesel particulate filter) 70. The operation and incorporation of these components into the system are well known, and thus, will not be discussed in further detail.

A secondary system 20 is also a component of the aftertreatment system 10. The secondary system 20 also delivers a reductant, such as urea, to the exhaust stream 40. The secondary system 20 includes a refillable or replaceable tank or canister 22 for storing a reductant or reductant-containing material (not shown), and a flow control module 24, coupled to the canister 22. The flow control module regulates the flow of reductant from the secondary system 20 into the exhaust stream 40.

The primary and secondary system 12, 20, also incorporate a dosing control system, which includes a sensors or plurality of sensors 30, and an electronic control module (ECM) 32, which is connected to the respective flow control module 16, 24 on each canister. Alternatively, the ECM 32 may be incorporated into the respective canisters. The sensor or sensors 30 are used for determining relevant operating conditions of the vehicle (not shown), including measuring the ambient temperatures, the $NO_x$ levels in the exhaust stream and engine operations, and for sending electronic inputs representative of these conditions to the electronic control module 32. The electronic control module 32 receives the sensor inputs and activates at least one of either the primary flow control module 16 or the secondary flow control module 24, or both based on the sensor inputs. Of course, conditions may exist where the electronic control module 32 receives inputs that result in neither of the modules being activated.

Based on the sensor readings, the primary system 12 will dose a reductant, such as ammonia from the primary canister 14 into the exhaust stream 40 upstream of the DPF 70. Alternatively, in particular during cold starts, the primary system 12 will dose downstream of the DPF directly to the SCR. The sensor(s) 30 comprises one or more of a selection of sensors including an exhaust gas temperature sensor, an ambient temperature sensor, an exhaust gas $NO_x$ sensor, and a primary $NO_x$ reductant flow sensor. Other sensors may be used depending on system requirements. The selected sensor(s) is/are coupled to the appropriate system component and to the electronic control module 32 to deliver information, which then is used to determine which of the flow modules, if either, to activate. It should be understood that the number of sensors incorporated into the system can vary depending on the requirements of a particular system.

During the initial start-up of an engine, especially under cold ambient temperatures, the urea of the secondary system 20 is often frozen. Depending on the conditions, it may take up to an hour or more for the urea to thaw sufficiently for effective $NO_x$ reduction. This, it is useful to incorporate the reductant-containing canister 14 of the primary system 12 to provide a "jump start" an initial dosing of reductant, typically ammonia, into the exhaust stream. Because of its compact size, the primary system canister 14 can be heated quickly after receiving the appropriate signals from the sensor(s) 30 to the electronic control module (ECM) 32, which are transmitted to the heating device (not shown) on or in connection with the primary canister. In this manner, the primary canister 14 can start releasing ammonia gas into the exhaust stream 40 practically from the initial start-up of the engine, while the secondary canister 22 containing the urea is thawed and readied. The flow of reductant from the primary canister 14 and the secondary canister 22 is directed through the ammonia flow modulator 16, 24 on each canister.

As noted above, in order to use the reductant, such as ammonia in the initial treatment of $NO_x$ in an exhaust system, it is necessary to apply a sufficient amount of heat to the primary canister 14, and thus the ammonia-containing material, in order to release the ammonia into its useful gaseous form. Heat sources (not shown) are generally external to the canister 14, and optionally include a heating jacket, heating element, or even heating through a flow of exhaust around the canister, or may even be incorporated into the canister itself Alternatively, the components and their arrangement within the system may vary. FIGS. 2 and 3 show alternative embodiments, 100 and 200 respectively, of the system. Additionally, the dosing of the first reductant and second reductant may also vary depending on the various system requirements, operating conditions or ambient temperature readings. For example, the system and method are particularly useful during cold start conditions, as well as lightly loaded application in conditions where the ambient temperature is below 45° F. where the SCR catalyst may not fully function.

Suitable material for use as the primary reductant include metal-ammine salts, which offer a solid storage medium for ammonia, and represent a safe, practical and compact option for storage and transportation of the primary reductant, typically ammonia. Ammonia may be released from the metal ammine salt by heating the salt to temperatures in the range from 10° C. to the melting point of the metal ammine salt complex, for example, to a temperature from 30° to 700° C., including a range of temperature of from 100° to 500° C. Generally speaking, metal ammine salts useful in the present device include the general formula $M(NH_3)_nX_z$, where M is one or more metal ions capable of binding ammonia, such as Li, Mg, Ca, Sr, V, Cr, Mn, Fe, Co, Ni, Cu, Zn, etc., n is the coordination number usually 2-12, and X is one or more anions, depending on the valence of M, where representative examples of X are F, Cl, Br, I, $SO_4$, $MoO_4$, $PO_4$, etc. Ammonia saturated strontium chloride, $Sr(NH_3)Cl_2$, is typically used. While embodiments using ammonia as the primary reductant are disclosed, the disclosure is not limited to such embodiments, and other reductants may be utilized instead of, or in addition to, ammonia for carrying out the systems disclosed and claimed herein.

According to the disclosed systems, a method for reducing $NO_x$ in an exhaust stream during initial engine start-up, can be generally understood. The method begins with the step of determining a need for $NO_x$ reduction in an exhaust stream. This can be done in a variety of ways using sensors to determine or approximate the $NO_x$ level of the exhaust stream. The method may also include determining the temperature of exhaust stream, which can be done simultaneously to determining or estimating the $NO_x$ level. Again, temperature sensors properly positioned provide a suitable means for determining the exhaust temperature. The method also includes determining the ambient temperature, again through the sensors, which then determines whether the primary system or the secondary system is activated. Generally, during a cold ambient temperature start-up, the primary system will be activated providing nearly immediate $NO_x$ reduction. As previously stated, the sensor readings from these steps will determine the operation of the NO$_x$ reduction system 10. Based on the sensor system inputs, the secondary reductant is subsequently dosed by injection into the exhaust stream.

Under cold-start conditions, the method includes the steps of providing a primary NO$_x$ reducing unit having a pre-determined amount of a first reductant-containing material stored therein, the primary unit having a primary dosing control system. The method also includes providing a secondary NO$_x$ reducing unit having a pre-determined amount of a second reductant material stored therein, the secondary unit having a secondary dosing control system. A plurality of sensors are provide, which are connected to the primary dosing control system and the secondary dosing control system. The sensors activate release of a first reductant from the primary unit into an exhaust stream based on a determination of a threshold ambient temperature through the sensors, resulting in injection of the first reductant into an exhaust stream upon activation. For example, the step of activating release of a first reductant from the primary unit into an exhaust stream further includes determining that the ambient temperature is below 12° F. The sensors also activate release of the second reductant from the secondary unit into the exhaust stream based upon a determination of operating conditions through the sensors, wherein the secondary reductant is injected into the exhaust stream. The method may also include the step of stopping a flow of the first reductant into the exhaust stream upon activating release of the second reductant into the exhaust.

What is claimed is:

1. An exhaust after-treatment system comprising:
   a primary system having a canister with a pre-determined amount of a first reductant containing material stored therein, the primary system having a primary flow control module;
   a secondary system having a canister with a pre-determined amount of a second reductant material stored therein, the secondary system having a secondary flow control module;
   a dosing control system for determining the amount of reductant released from the primary system and the secondary system relative to operating conditions; and
   an electronic control module for initially activating the primary flow control module and then the secondary flow control module based on operating conditions;
   one of the canisters containing a supply of an ammonia-containing material;
   a heating element coupled to the canister;
   tubing for fluidly connecting the canister with a vehicle exhaust stream; and
   an injection system connected to the tubing for injecting ammonia into the vehicle exhaust stream.

2. The exhaust after-treatment system of claim 1, wherein the ammonia-containing material comprises strontium chloride salts.

3. The exhaust after-treatment system of claim 1, wherein the reductant in the canister of the secondary system comprises urea.

4. The exhaust after-treatment system of claim 1, wherein the electronic control module activates the primary system upon engine start-up.

5. The exhaust after-treatment system of claim 1, wherein the electronic control module activates the primary system when operating conditions include ambient temperatures below 12° F.

6. The exhaust after-treatment system of claim 1, wherein the electronic control module activates the primary system for release of the first reductant prior to the activation of the secondary system.

7. The exhaust after-treatment system of claim 1, wherein the electronic control module shuts off the primary system and activates the secondary system.

8. A method for reducing NOx in an exhaust stream, the method comprising the steps of:
   providing a primary tank having a pre-determined amount of a first reductant-containing material stored therein, the primary tank having a primary dosing control system;
   providing a secondary tank having a pre-determined amount of a second reductant material stored therein, the secondary tank having a secondary dosing control system;
   providing a plurality of sensors connected to the primary dosing control system and the secondary dosing control system;
   activating release of a first reductant from the primary tank into an exhaust stream based on a determination of a threshold ambient temperature through the sensors;
   injecting the first reductant into an exhaust stream upon activation;
   activating release of the second reductant from the secondary tank into the exhaust stream based upon a determination of operating conditions through the sensors;
   injecting the secondary reductant into the exhaust stream; and
   wherein the step of activating release of a first reductant from the primary tank into an exhaust stream further includes determining that the ambient temperature is below 12° F.

9. The method of claim 8, wherein the method further includes the step of stopping a flow of the first reductant into the exhaust stream upon activating release of the second reductant into the exhaust stream.

* * * * *